(No Model.)
M. SHAABER.
TROLLEY WIRE CLEANER.
No. 504,405.   Patented Sept. 5, 1893.
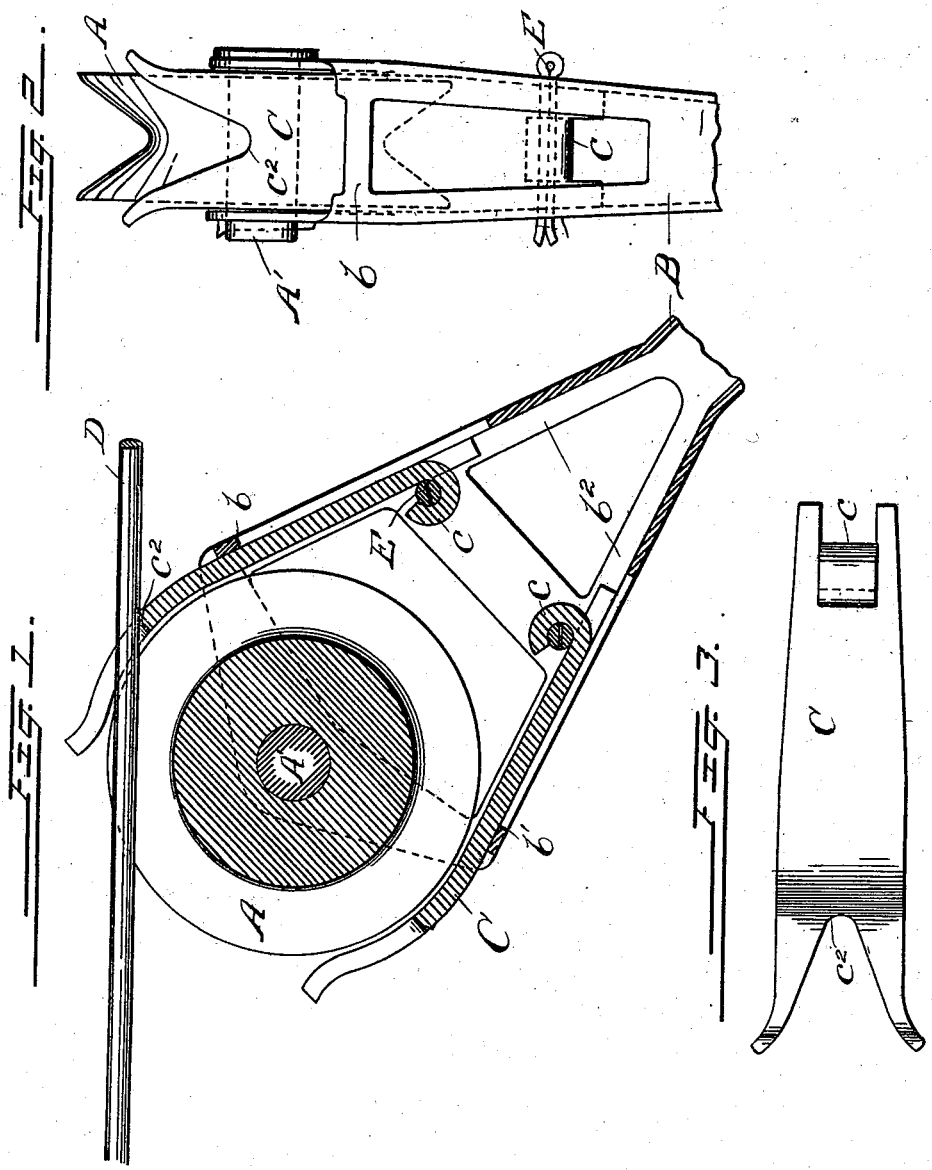

UNITED STATES PATENT OFFICE.

MAHLON SHAABER, OF READING, PENNSYLVANIA, ASSIGNOR OF ONE-HALF TO JACOB S. AMMON, OF SAME PLACE.

TROLLEY-WIRE CLEANER.

SPECIFICATION forming part of Letters Patent No. 504,405, dated September 5, 1893.

Application filed June 19, 1893. Serial No. 478,162. (No model.)

*To all whom it may concern:*

Be it known that I, MAHLON SHAABER, a citizen of the United States, residing at Reading, in the county of Berks and State of Pennsylvania, have invented certain Improvements in Trolley-Wire Cleaners, of which the following is a specification.

My invention relates to trolley mechanisms for electric railways and consists in certain improvements whereby the trolley wire may be kept clear of the sleet and ice which in winter are apt to accumulate and greatly interfere with the proper running of cars. Heretofore a number of mechanisms have been devised for this purpose, including scraping devices arranged to be brought into contact with the wire when desired; but such devices so far as I am aware have been more complicated in construction and operation and more expensive in application than is desirable.

My object is to provide a very simple and inexpensive arrangement which will at the same time operate certainly and effectively.

The invention is fully described in connection with the accompanying drawings and is specifically pointed out in the claims.

Figure 1 is a sectional side view of the upper end of a trolley arm provided with my improvement and shown in contact with a trolley wire. Fig. 2 is an edge view of the same, showing the trolley arm in vertical position instead of the normal inclined position indicated in Fig. 1. Fig. 3 is a detail view of one of the scraper plates.

A represents the trolley wheel which is mounted on the spindle A' in a trolley frame B. This frame is represented as triangular in form having front and rear faces $b$ and $b'$ and side plates in which the spindle A' is fixed. The front and rear faces are provided with inwardly projecting ribs or flanges which form between them slide-ways for the reception of scraper-plates C. These scraper plates C may be conveniently and cheaply formed of sheet metal. They are of a proper width to fit between the flanges forming the ways $b^2$ and have a portion of the metal at their lower ends bent inward to form pin lugs or projections $c$ which engage pins E extending crosswise through the trolley frame. Their upper ends are V-shaped and the bottom $c^2$ of the V-shaped grooves are arranged at a sufficient height with relation to the trolley wheel A to insure either one or other of the two scrapers coming in contact with the under side of the trolley wire D depending upon the direction in which the trolley arm is standing, which of course is reversed at the end of each trip. The scrapers C are preferably a little wider than the trolley wheel and are arranged at a tangent to the rim of the latter upon which they are pressed so as to prevent rotation of the wheel when the scraper is riding against the bottom of the trolley wire. The V-shaped ends may be extended so as to find the wire with greater ease and may be curved to provide a better bearing against the rim of the trolley wheel. In ordinary service the scrapers C are removed so as to permit the trolley wheel to ride on the wire. When occasion requires however they are applied with the greatest ease in a few moments, and maintain perfect contact and feed of the current to the car motor.

What I claim is—

1. The combination with the trolley wheel of a trolley frame in which said wheel is mounted, said frame having ways $b^2$ in front and rear of the wheel, and scraper-plates C removably held in said ways by means of lugs $c$ on the plates and cross-pins engaging the same, said scraper plates having V-shaped upper ends arranged to ride upon the trolley wire and to bear upon the rim of the wheel, all substantially as set forth.

2. The combination with the trolley wheel and the frame in which said wheel is mounted, of the tangentially arranged scraper plates removably secured to said frame in front and rear of the trolley wheel and having their upper ends in sliding contact with the trolley wire and in fixed contact with the rim of the trolley wheel, substantially as set forth.

In testimony whereof I affix my signature in presence of two witnesses.

MAHLON SHAABER.

Witnesses:
MAHLON METCZ,
H. G. PRINTZ.